United States Patent
Huxham et al.

(10) Patent No.: US 9,660,814 B2
(45) Date of Patent: May 23, 2017

(54) PROVIDING DIGITAL CERTIFICATES

(71) Applicant: Visa International Service Association, San Francisco, CA (US)

(72) Inventors: Horatio Nelson Huxham, Cape Town (ZA); Alan Joseph O'Regan, Cape Town (ZA)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/784,901

(22) PCT Filed: Apr. 25, 2014

(86) PCT No.: PCT/IB2014/061008
§ 371 (c)(1),
(2) Date: Oct. 15, 2015

(87) PCT Pub. No.: WO2014/174491
PCT Pub. Date: Oct. 30, 2014

(65) Prior Publication Data
US 2016/0149710 A1    May 26, 2016

(30) Foreign Application Priority Data
Apr. 26, 2013  (ZA) .................................. 2013/03076

(51) Int. Cl.
*H04L 29/06*         (2006.01)
*H04L 9/32*          (2006.01)
(Continued)

(52) U.S. Cl.
CPC ...... *H04L 9/3263* (2013.01); *G06F 17/30864* (2013.01); *H04L 9/0827* (2013.01);
(Continued)

(58) Field of Classification Search
None
See application file for complete search history.

(56) References Cited

U.S. PATENT DOCUMENTS

2002/0002589 A1* 1/2002 Yonenaga ........... G06F 21/6218
                                                        709/206
2002/0083178 A1* 6/2002 Brothers ................ G06F 21/10
                                                        709/226
(Continued)

FOREIGN PATENT DOCUMENTS

EP         2096830 A1      9/2009
KR   10-2013-0021774 A     3/2013
(Continued)

OTHER PUBLICATIONS

European Search Report mailed Apr. 20, 2016 in European Patent Application No. 14788142.9, 7 pages.
(Continued)

*Primary Examiner* — Izunna Okeke
*Assistant Examiner* — Malcolm Cribbs
(74) *Attorney, Agent, or Firm* — Kilpatrick Townsend & Stockton LLP

(57) ABSTRACT

Systems, methods and devices for providing digital certificates are disclosed. In a method conducted at a remotely accessible server, a request, including an identifier, for a digital certificate is received. A communication address of a mobile device, having a certificate store module in communication therewith, associated with the identifier is then obtained. A request for a digital certificate is transmitted to the certificate store module via the mobile device and the certificate store module is configured to prompt a user thereof, via the mobile device, for a passcode before releasing the certificate. The digital certificate is received from the certificate store module via the mobile device in response to entry of a passcode into the certificate store module which
(Continued)

corresponds to an offset stored in the certificate store module. The digital certificate is then transmitted to a communication device for use in digitally signing or encrypting a data message.

17 Claims, 10 Drawing Sheets

(51) Int. Cl.
  *H04L 9/08* (2006.01)
  *H04W 12/04* (2009.01)
  *G06F 17/30* (2006.01)
  *H04L 29/08* (2006.01)
  *G06F 21/78* (2013.01)

(52) U.S. Cl.
  CPC ........ *H04L 9/3226* (2013.01); *H04L 63/0853* (2013.01); *H04L 67/2804* (2013.01); *H04W 12/04* (2013.01); *G06F 21/78* (2013.01); *H04L 63/062* (2013.01); *H04L 63/083* (2013.01); *H04L 63/0823* (2013.01); *H04L 67/02* (2013.01); *H04L 67/306* (2013.01); *H04L 2209/64* (2013.01)

(56) References Cited

U.S. PATENT DOCUMENTS

| | | | |
|---|---|---|---|
| 2002/0138729 A1* | 9/2002 | Miettinen | G06Q 20/341 713/173 |
| 2008/0105742 A1* | 5/2008 | Kim | H04W 12/02 235/386 |
| 2011/0149533 A1 | 6/2011 | Luo et al. | |
| 2012/0079275 A1* | 3/2012 | Tsao | G06F 21/6209 713/170 |
| 2012/0110333 A1* | 5/2012 | Lukkarila | H04L 9/14 713/176 |
| 2012/0278614 A1 | 11/2012 | Choi | |
| 2013/0290718 A1* | 10/2013 | Zhuang | G06Q 20/10 713/168 |

FOREIGN PATENT DOCUMENTS

| | | |
|---|---|---|
| WO | 2010/056969 A2 | 5/2010 |
| WO | WO2013-013192 A2 | 1/2013 |

OTHER PUBLICATIONS

International Search Report Mailed Aug. 20, 2014 in PCT/IB2014/061008, 3 pages.

\* cited by examiner

PROVIDING DIGITAL CERTIFICATES

CROSS-REFERENCES TO RELATED APPLICATIONS

This application is a National Stage of International Application No. PCT/IB2014/061008, International Filing Date Apr. 25, 2014, and which claims the benefit of South African Patent Application No. 2013/03076, filed Apr. 26, 2013, the disclosures of both applications being incorporated herein by reference.

FIELD OF THE INVENTION

This invention relates to systems, methods and devices for providing digital certificates.

BACKGROUND

A data message, such as an email, being sent from a sender device can pass through many gateways, computer systems, servers, routers or any other such node en route to a recipient device. The sender often has no control over the gateways, computer systems, servers, routers or other nodes through which his or her data message passes, and is often not even aware of the path that the data message follows in being sent to the recipient device.

As a result, the data message may easily be intercepted, read or even altered at any one of these nodes by a third party, meaning that the integrity, confidentiality and/or validity of the data message and the contents thereof may be questionable should it finally reach the intended recipient device.

There have been many developments over the years which purport to address the problem of data message integrity, confidentiality and/or validity.

One such solution which has gained some degree of traction involves the use of public-key cryptography to digitally sign data messages at the sender device to produce a 'digital signature'. The digital signature may ensure that the data message cannot be read or altered at an intermediary node, meaning that the data message received at the recipient device may be authenticated as being unaltered and unread during transmission.

Public-key cryptography refers to a cryptographic system typically requiring two separate keys, one of which is 'private' and the other 'public'. The public key may be used to encrypt data or verify a digital signature while the private key may be used to decrypt the encrypted data or to create a digital signature. Neither key can perform both functions individually. Typically, a user's public key may be published while the corresponding private key should be kept secret.

For instance, when digitally signing a data message, the data message (or more typically a hash of the data message) may be encrypted at the sender device using the sender's private key. This digitally signed data message may then be transmitted to a recipient along with the original data message as well as the sender's public key. The recipient may then decrypt the digitally signed data message using the public key and compare the decrypted digitally signed data message with the original data message (or more typically hashes of both).

When encrypting a data message, the sender makes use of the recipient's public key to encrypt the data message. The encrypted data message is transmitted from the sender to the recipient. The recipient then uses the recipient's private key to decrypt the data message.

Digital certificates are typically issued by certificate authorities and may be used to bind a public key to an identity. They may also include information about the entity or individual to whom the certificate was issued and may also include information about the certificate authority that issued the digital certificate.

Current devices for storing digital certificates may lack required levels of security and thus digital certificates stored therein may be susceptible to attack or fraudulent use.

BRIEF SUMMARY

In accordance with a first aspect of the invention, there is provided a method for providing digital certificates, conducted at a remotely accessible server and comprising the steps of: receiving a request for a digital certificate, the request including an identifier; obtaining a communication address of a mobile device associated with the identifier, wherein the mobile device has a certificate store module in communication therewith; transmitting a request for a digital certificate to the certificate store module via the mobile device, wherein the certificate store module is configured to prompt a user thereof, via the mobile device, for a passcode before releasing the certificate; receiving the digital certificate from the certificate store module via the mobile device in response to entry of a passcode into the certificate store module which corresponds to an offset stored in the certificate store module; and, transmitting the digital certificate to a communication device for use in digitally signing or encrypting a data message.

Further features of the invention provide for the step of obtaining a communication address of a mobile device associated with the identifier to include steps of: extracting the identifier from the request; querying a database to determine if the identifier has been registered with the remotely accessible server; and, if the identifier is registered, obtaining, from the database, a communication address of a mobile device associated with the identifier, the mobile device having a certificate store module in communication therewith.

A still further feature of the invention provides for the step of receiving a request for a digital certificate to include receiving a hypertext transfer protocol request message.

Yet further features of the invention provide for the step of extracting an identifier from the request to include extracting the identifier from a path portion of a uniform resource locator (URL) submitted to the remotely accessible server by the communication device, and for the identifier to be an alphanumeric sequence uniquely associated with the certificate store module.

A further features of the invention provides for the step of extracting the identifier from the request to include extracting an email address included in the request.

Still further features of the invention provide for the steps of requesting a digital certificate from the certificate store module, receiving a digital certificate from the certificate store module and, transmitting the digital certificate to the communication device to be conducted over an encrypted tunnel; and for the encrypted tunnel to be an internet protocol security (IPSec), secure socket layer (SSL), transport layer security (TLS) or secure shell (SSH) encrypted tunnel.

Yet further features of the invention provide for the certificate store module to be configured to transmit the digital certificate to the remotely accessible server only in response to receiving a request for a digital certificate from the remotely accessible server, and for functions performed by the mobile device and functions performed by the communication device to be performed by a single device.

Further features of the invention provide for the step of obtaining a communication address of a mobile device associated with the identifier to include steps of: comparing the obtained communication address with a communication address of the mobile device from which the request was transmitted.

In accordance with a second aspect of the invention, there is provided a method for providing digital certificates conducted at a mobile device which has a certificate store module coupled thereto in which a digital certificate is stored, the method comprising the steps of: receiving, from a remotely accessible server, a request for a digital certificate, the request having been transmitted by the remotely accessible server in response to the remotely accessible server receiving a digital certificate request; receiving a passcode entered by a user in order to authorize release of the digital certificate; comparing the entered passcode to an offset thereof; and, if the entered passcode corresponds to the offset, transmitting the digital certificate from the certificate store module to the remotely accessible server for transmission to a communication device and use in digitally signing or encrypting a data message thereat.

A further feature of the invention provides for the step of receiving a request for a digital certificate to receive the request for a digital certificate at the certificate store module via the mobile device.

Yet further features of the invention provide for the step of receiving a passcode entered by a user to receive the passcode at the certificate store module via the mobile device, and for the step of comparing the entered passcode to an offset thereof to be conducted at the certificate store module.

In accordance with a third aspect of the invention, there is provided a system for providing digital certificates comprising a remotely accessible server which includes: a request receiving component for receiving a request for a digital certificate, the request including an identifier; an obtaining component for obtaining a communication address of a mobile device associated with the identifier, wherein the mobile device has a certificate store module in communication therewith; a request transmitting component for transmitting a request for a digital certificate to the certificate store module via the mobile device, wherein the certificate store module is configured to prompt a user thereof, via the mobile device, for a passcode before releasing the certificate; a digital certificate receiving component for receiving the digital certificate from the certificate store module via the mobile device in response to entry of a passcode into the certificate store module corresponding to an offset stored in the certificate store module; and, a digital certificate transmitting component for transmitting the digital certificate to a communication device for use in digitally signing or encrypting a data message.

Further features of the invention provide for the system to further include a mobile device which has a certificate store module coupled thereto in which a digital certificate is stored, for the mobile device to include: a request receiving component for receiving, from the remotely accessible server, the request for a digital certificate, the request having been transmitted by the remotely accessible server in response to the remotely accessible server receiving a digital certificate request; a passcode receiving component for receiving a passcode entered by a user in order to authorize release of the digital certificate; a comparing component for comparing the entered passcode to an offset thereof; and, a digital certificate transmitting component for, if the entered passcode corresponds to the offset, transmitting the digital certificate from the certificate store module to the remotely accessible server for transmission to a communication device and use in digitally signing or encrypting the data message thereat.

Still further features of the invention provide for the system to further include a communication device which is configured: to transmit a request for a digital certificate to the remotely accessible server; to receive the digital certificate from the remotely accessible server; and, to digitally sign or encrypt the data message using the received digital certificate.

A yet further feature of the invention provides for the digital certificate to be a secure/multipurpose internet mail extensions (S/MIME) standard digital certificate for public key encryption.

A still further feature of the invention provides for the certificate store module to be disposed in the mobile device.

Yet further features provide for the certificate store module to be coupled to or disposed in a certificate store label; and for the certificate store label to be coupled to a communication component of the mobile device.

Further features of the invention provide for the certificate store module to be disposed in a communication component of a mobile device; and for the communication component to be a subscriber identity module (SIM) card.

Still further features of the invention provide for the certificate store module to be configured to transmit the digital certificate to the remotely accessible server only in response to receiving a request for a digital certificate from the remotely accessible server, for functions performed by the mobile device and functions performed by the communication device to be performed by a single device, and for the single device to be the mobile device.

In accordance with a fourth aspect of the invention, there is provided a certificate store label for providing digital certificates comprising: a first set of electrical contacts disposed on a top side of the certificate store label for interfacing to a mobile device; a second set of electrical contacts disposed on a bottom side of the certificate store label for interfacing to a communication component; a coupling element configured to attach the certificate store label to the communication component; and a certificate store module disposed in the certificate store label and coupled to the first and second sets of electrical contacts, wherein the certificate store module has a digital certificate stored therein and includes: a request receiving component for receiving, from a remotely accessible server, a request for a digital certificate, the request having been transmitted by the remotely accessible server in response to the remotely accessible server receiving a digital certificate request; a passcode receiving component for receiving a passcode entered by a user in order to authorize release of the digital certificate; a comparing component for comparing the entered passcode to an offset thereof; and, a digital certificate transmitting component for, if the entered passcode corresponds to the offset, transmitting the digital certificate from the certificate store module to the remotely accessible server for transmission to a communication device and use in digitally signing or encrypting a data message thereat.

Further features of the invention provide for the certificate store module to include a secure processing unit and a public processing unit; for the secure processing unit and public processing unit to be logically and physically isolated from each other; and for the digital certificate to be securely stored in the secure processing unit.

Further features of the invention provide for the certificate store module to be a hardware security module; for coupling element to be an adhesive layer; for the communication component to be a subscriber identity module (SIM) card; and for the digital certificate to be a secure/multipurpose internet mail extensions (S/MIME) standard digital certificate for public key encryption.

In accordance with a fifth aspect of the invention, there is provided a computer program product for providing digital certificates, the computer program product comprising a computer-readable medium having stored computer-readable program code for performing the steps of: receiving a request for a digital certificate, the request including an identifier; obtaining a communication address of a mobile device associated with the identifier, wherein the mobile device has a certificate store module in communication therewith; transmitting a request for a digital certificate to the certificate store module via the mobile device, wherein the certificate store module is configured to prompt a user thereof, via the mobile device, for a passcode before releasing the certificate; receiving the digital certificate from the certificate store module via the mobile device in response to entry of a passcode into the certificate store module corresponding to an offset stored in the certificate store module; and, transmitting the digital certificate to a communication device for use in digitally signing or encrypting a data message.

Further features of the invention provide for the computer-readable medium to be a non-transitory computer-readable medium and for the computer-readable program code to be executable by a processing circuit.

DETAILED DESCRIPTION

A digital certificate, which may also be known as a public key certificate or identity certificate, is an electronic document that binds a public key with an identity (for example a name of a user or organization). In other words, the digital certificate may be used to verify that a public key belongs to an individual or organization. A digital certificate may include a serial number used to uniquely identify the certificate, a subject (the person, or entity identified), a signature algorithm, a signature used to verify that it came from the issuer, an issuer identifier of the entity that verified the information and issued the certificate, a valid-from date, a valid-to date, key-usage indicating the purpose of the public key (e.g. encryption, signature, certificate signing, etc.), a public key, a thumbprint algorithm used to hash the digital certificate and a thumbprint which is the hash itself and is used as an abbreviated form of the digital certificate.

Embodiments of the invention provide a certificate store module in which one or more digital certificates may be stored. The certificate store module may be coupled to mobile device. Furthermore, the certificate store module may be configured to only accept requests for digital certificates from a remotely accessible server. In response to receiving such a request, the certificate store module may transmit the digital certificate to the remotely accessible server.

The certificate store module may be: built into the hardware of the mobile device; disposed in a communication component which is coupled to and in communication with the mobile device; provided in a label which may be coupled to and in communication with both the mobile device and a communication component of the mobile device; or otherwise coupled to and in electrical communication with the mobile device.

Figure 1:
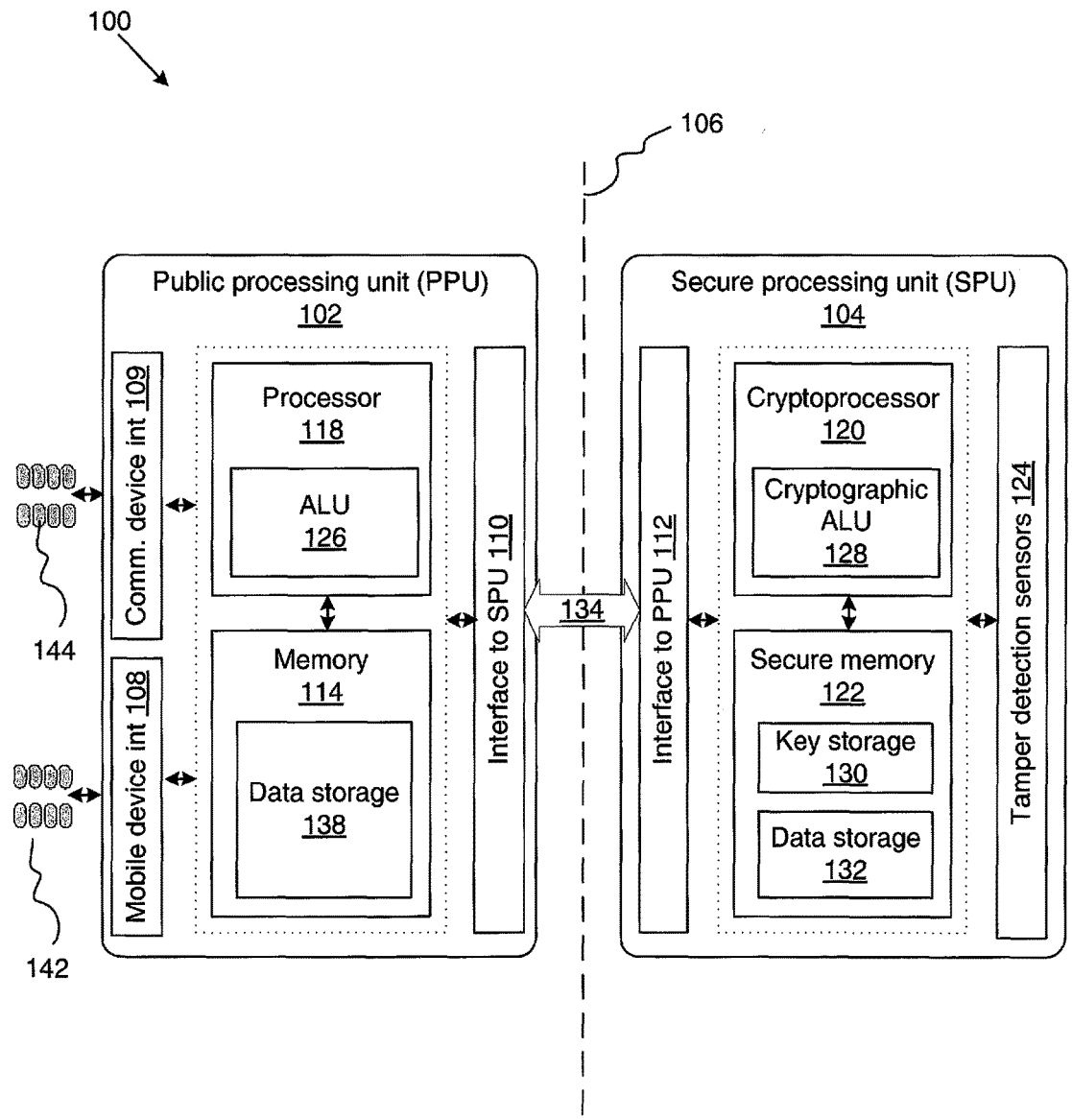
FIG. 1 is a block diagram which illustrates the hardware components of a certificate store module according to embodiments of the invention.

FIG. 1 shows a block diagram illustrating hardware components of a certificate store module (100) according to embodiments of the invention. The certificate store module (100) includes a public processing unit (PPU) (102) and a secure processing unit (SPU) (104) which is coupled to the PPU (102). It should be noted that although the SPU (104) is coupled to the PPU (102), the certificate store module (100) provides a logical and/or physical separation (106) between the SPU (104) and the PPU (102). A "physical separation" refers to some physical boundary between the SPU (104) and the PPU (102). For example, the SPU (104) and the PPU (102) can be implemented with and manufactured as separate semiconductor dies or separately packaged semiconductor chips, and the physical boundary of the dies or chips can serve as the physical separation. A "logical separation" refers to the separation of a communication interface and a storage memory between the SPU (104) and the PPU (102). As shown in FIG. 1, the PPU (102) has a mobile device interface (108) and a communication interface to the SPU (110) which are separate from a communication interface to the PPU (112) of the SPU (110). The PPU (102) also has its own memory (114), which may be a secure memory, and which is separate from a secure memory (122) of the SPU (104). As will be explained below, the logical and/or physical separation (106) provided between the SPU the (104) and the PPU (102) creates a division in hardware roles to protect the SPU (104) and the contents stored in its secure memory (122) from unauthorized accesses.

According to some embodiments, the PPU (102) includes a processor (118), memory (114), an interface to a mobile device (108), a communication device interface (109), and a PPU-to-SPU interface (110). The processor (118) can be implemented as one or more processors or controllers or may be implemented using one or more cryptographic processors.

The memory (114) is coupled to the processor (118), and provides storage to store data and executable code that when executed by the processor (118), causes the processor (118) to run an operating system (OS) and/or applications to manage the functionality and operations of the certificate store module (100), and to process the exchange of information between the various interfaces of the PPU (102). The memory (114) may also include a data storage (238).

The PPU-to-SPU interface (110) is coupled to the SPU (104), and provides a set of signals that can include a clock signal and one or more data input/output (I/O) signals to send commands and information such as digital certificate requests or encryption and decryption requests to the SPU (104), and to receive commands and information such as digital certificates or encryption and decryption results from the SPU (104). Because of the logical and physical separation (106) between the SPU (104) and the PPU (102), the SPU (104) is exposed to the PPU (102) only, and is not accessible to the mobile device or to the communication component, except through the PPU (102). Hence, the PPU (102) can serve as a firewall or a gatekeeper to ensure unauthorized or unwanted communications such as hacking attempts are not sent to the SPU (104).

According to some embodiments, the SPU (104) includes a cryptoprocessor (120), a secure memory (122), and a SPU-to-PPU interface (112). The SPU (104) can also include tamper detection sensors (124). As mentioned above, the SPU (104) is accessible from the PPU (102) only, and receives commands and information from the PPU (102) through the SPU-to-PPU interface (112). The SPU-to-PPU interface (112) provides a set of signals that can include a clock signal and one or more data input/output (I/O) signals coupled to the PPU-to-SPU interface (110) that the SPU (104) can use to communicate with the PPU (102). In some embodiments, the SPU (104) will only respond to payment credential or encryption and decryption requests from the PPU (102) received through the SPU-to-PPU interface (112).

The cryptoprocessor (120) can be implemented as one or more processors, controllers or cryptographic processors. A cryptographic processor is different from a general purpose processor in that a cryptographic processor includes dedicated circuitry and hardware such as one or more cryptographic arithmetic logic units (ALUs) (128) which are optimized to perform computational intensive cryptographic functions. Such a cryptographic ALU (128) can include optimized pipelines and wider data buses to enable the cryptoprocessor to perform cryptographic operations faster and more efficiently than general purpose processors.

The secure memory (122) is coupled to the cryptoprocessor (120), and may be partitioned into a cryptographic key storage (130) and a data storage (132). The data storage (132) can be read and written by the cryptoprocessor (120), and provides storage memory to store user data such as digital certificates, data that are received on the SPU-to-PPU interface (112) from the PPU (102), and encryption and decryption results that are sent to the PPU (102) through the SPU-to-PPU interface (112). The cryptographic key storage (130) can be read-only to the cryptoprocessor (120), and may be used to store cryptographic keys such as private keys and public keys, encryption algorithms and/or one or more passcode (or PIN) offsets corresponding to one or more digital certificates. The passcode (or PIN) offsets and cryptographic keys and algorithms stored in the cryptographic key storage (130) may be provisioned by the manufacturer during manufacturing of the certificate store module (100), and cannot be altered by an external source without a master key that is only known to the manufacturer and/or authorized parties who are authorized to provision the certificate store module (100), such as a mobile network operator or a wireless service provider. In some embodiments, the contents of the cryptographic key storage (130) are never transmitted outside of the SPU (104), and are inaccessible by the PPU (102). The cryptographic keys and algorithms stored in the cryptographic key storage (130) can be provisioned to perform various encryption standards and protocols including but not limited to Advanced Encryption Standard (AES), Data Encryption Standard (DES), Triple Data Encryption Standard/Algorithm (TDES/TDEA), Secure Socket Layer (SSL), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols.

In some embodiments, the SPU (104) may also include tamper detection sensors (124) to detect external attempts to tamper with the certificate store module (100). For example, the tamper detection sensors (124) may include temperature sensors to detect temperatures that may be indicative of someone attempting to de-solder components of the certificate store module (100), and/or mechanical sensors to sense structural changes to the certificate store module (100) that may be indicative of someone attempting to dissect or cut open the certificate store module (100). The tamper detection sensors (124) may also include electrical sensors to sense certain voltage, current, or impedance changes to the circuitry of the certificate store module (100) that may be indicative of someone attempting to probe the components of the certificate store module (100), and/or electromagnetic sensors to sense certain radiation such as X-rays that may be indicative of someone attempting to examine the certificate store module (100). In some embodiments, the tamper detection sensors (124) may include circuitry that can erase and wipe out the contents of the secure memory (122) to render the SPU (104) and/or the certificate store module (100) unusable in response to detecting an attempt to tamper with the certificate store module (100). The certificate store module (100) can also be configured with organic or soluble interconnects that can be dissolved by a solvent released by the tamper detection sensors (124) in response to detecting an attempt to tamper with the certificate store module (100).

Embodiments of the invention provide for the SPU (104) and/or the PPU (102) to be a security integrated circuit such as those which may be found on a "chip and pin" credit card or smart card. Exemplary SPUs may include those made by NXP Semiconductors GmbH, Samsung, STMicroelectronics, Atmel, INSIDE electronics, Infineon Technologies AG or the like, which have been listed by EMVCo as approved products for use in Europay-Mastercard-Visa (EMV) credit cards. Alternatively, the SPU (104) may be equivalent to products approved for use in EMV credit cards in that they meet similar security requirements as laid out by EMVCo or another standards organization and may also implement a layer seven application firewall. In some embodiments, the certificate store module (100) may be a hardware security module.

As has been mentioned, embodiments of the invention provide for the certificate store module (100) to be coupled to a mobile device in a variety of ways. For example, in some embodiments of the invention, the certificate store module (100) may be built into hardware of a mobile device. The certificate store module (100) may be provided as one or more integrated circuits disposed on a printed circuit board of the mobile device and may be in communication with a communication bus of the mobile device.

In another embodiment, the certificate store module (100) may be disposed in or integrated into a communication component which is coupled to and in communication with the mobile device. The communication component may, for example be a Universal Integrated Circuit Card (UICC) such as a subscriber identity module (SIM) card or the like. The certificate store module (100) may in electrical communication with electrical contacts of the communication component such that, when the communication component is coupled to and in electrical communication with the mobile device, the certificate store module (100) may too be in communication with the mobile device.

By coupling the certificate store module (100) to a mobile device, the certificate store module (100) according to embodiments of the invention may receive user input via a user interface of the mobile device and to communicate with a remotely accessible server over a mobile network via the mobile device.

In another embodiment of the invention, the certificate store module may be disposed in a label. In such an embodiment of the invention, the mobile device interface (108) of the certificate store module (100) may be coupled to a set of electrical contacts (142) that interface with a mobile device (e.g., a mobile phone), and may provide a set of signals that can include a clock signal and one or more data input/output (I/O) signals to send and receive commands and information between the PPU (102) and the mobile device. The certificate store module (100) may include a communication device interface (109) coupled to a set of electrical contacts (144) that interface with a communication component such as a communication card (e.g., a SIM card), and provide a set of signals that can include a clock signal and one or more data input/output (I/O) signals to send and receive commands and information between the PPU (102) and the communication component.

Figure 2A:
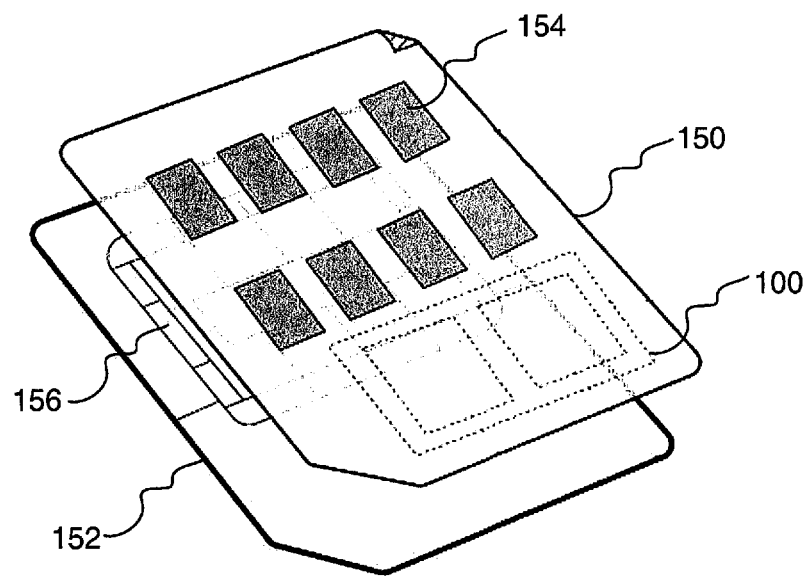
FIG. 2A is a perspective view of a certificate store label according to an embodiment of the invention.

FIG. 2A illustrates a perspective view of a certificate store label (150) in which a certificate store module (100) according to embodiments of the invention may be disposed. The certificate store label (150) can be adhered to a communication component of a mobile device. Exemplary communication components include a subscriber identity module (SIM) card, a smart card or a memory card. Exemplary mobile devices include a mobile phone, a tablet computer, a laptop computer, a personal digital assistant or the like. In the illustrated embodiment, the communication component is a mini-SIM card (152).

Figure 2B:
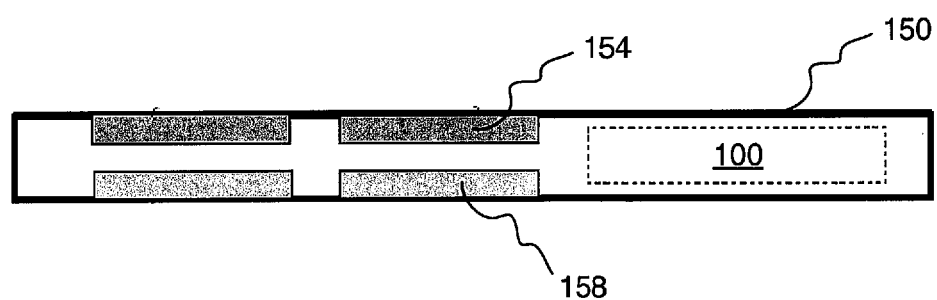
FIG. 2B is a sectional view of a certificate store label according to an embodiment of the invention.

FIG. 2B shows a sectional view of the certificate store label (150) of FIG. 2A. The label (150) comprises a first set of electrical contacts (154) disposed on a top side of the label (150) for interfacing to a mobile device and a second set of electrical contacts (158) disposed on a bottom side of the label (150) for interfacing to electrical contacts (156) of a SIM card (152). Embodiments of the invention may further provide that the label (150) be restricted for use on one SIM card (152). For example, the label (150) may be compatible with a SIM card (152) having a specific ICCID or IMSI number. This would mean that the label (150) cannot be removed from its SIM card (152) and placed on another.

Alternatively, the label (150) may be restricted to a SIM card of a particular mobile network operator, or of may be limited to a SIM card corresponding to a particular MSISDN. It should be appreciated that the term "disposed in" includes embodiments of the invention where the certificate store module (100) is disposed on an external surface of the certificate store label (150) or the like.

The certificate store module (100) according to the various embodiments described above may accordingly be configured to intercept messages having requests for digital certificates sent to the mobile device from a remotely accessible server over a mobile communication network. The certificate store module (100) may be configured to then obtain user authentication by comparing a passcode entered by a user via the mobile device to an offset stored thereof. If the passcode and the offset correspond, the certificate store module (100) is configured to release the requested digital certificate from the SPU (104) to the PPU (102) for communication therefrom to the remotely accessible server.

Figure 3:
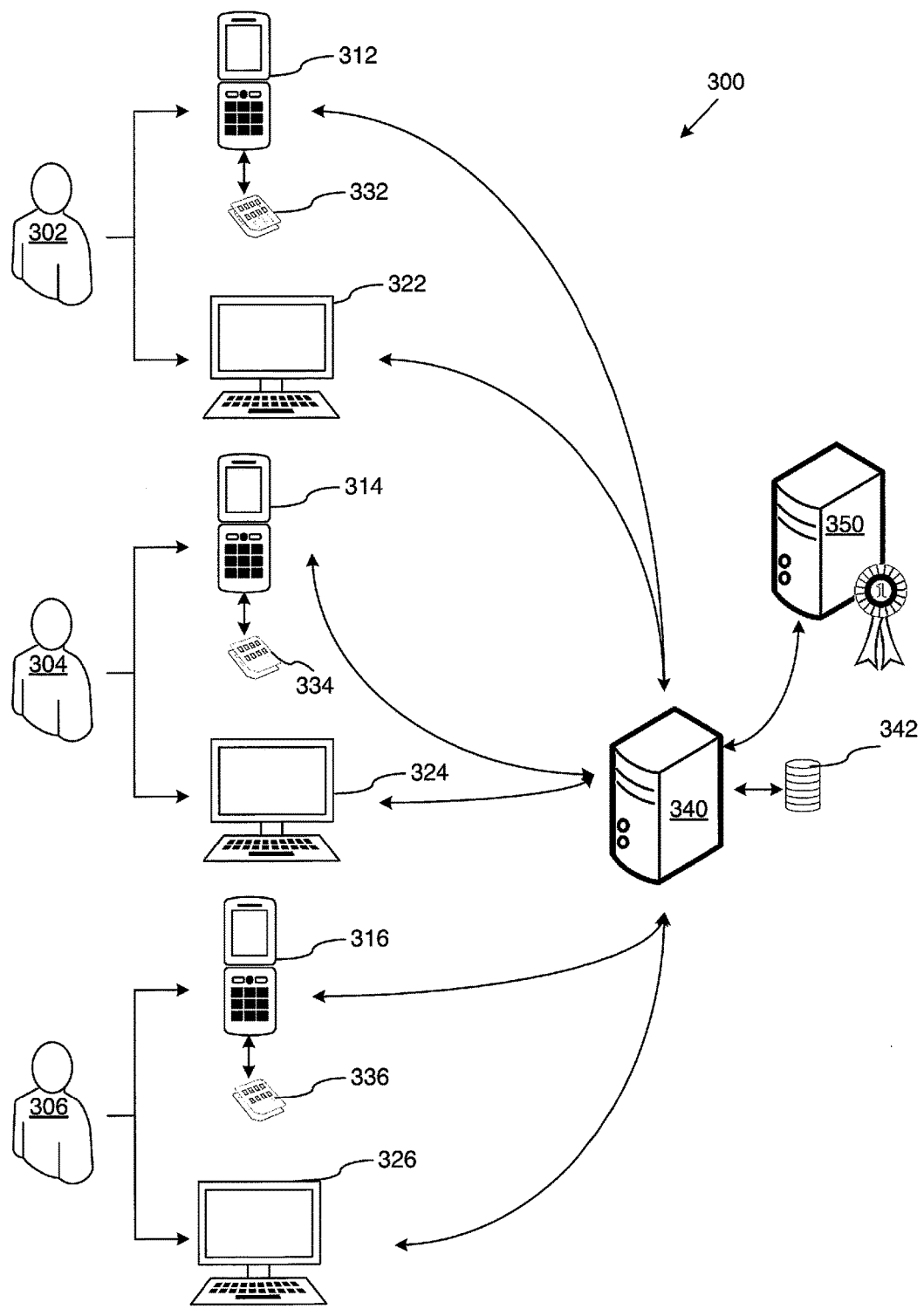
FIG. 3 is a block diagram which illustrates a system according to embodiments of the invention.

FIG. 3 illustrates a schematic diagram of a system (300) according to embodiments of the invention. The system (300) includes a plurality of mobile devices (312, 314, 316) and a plurality of communication devices (322, 324, 326), each of which is operated by one of the plurality of users of the system (302, 304, 306). The system also includes a remotely accessible server (340) having at least a user profile database (342) stored thereon. The plurality of communication devices (322, 324, 326) and the plurality of mobile devices (312, 314, 316) are each in communication with the remotely accessible server (340). This communication may be conducted over an encrypted tunnel which may, for example, be an internet protocol security (IPSec), secure socket layer (SSL), transport layer security (TLS) or secure shell (SSH) encrypted tunnel.

Each of the plurality of mobile devices (312, 314, 316) may be any appropriate mobile device, examples of which include mobile phones, tablet computers, personal digital assistants, smart phones, laptop computers or the like. Each one of the plurality of mobile devices has a certificate store module (332, 334, 336) coupled thereto.

In the embodiment of the system (300) illustrated in FIG. 3, each of the plurality of certificate store modules is disposed in a certificate store label which is attached or coupled to a communication component of a corresponding mobile device. Other implementations, however, may see the certificate store module being disposed directly in the mobile device, in a SIM card of the mobile device or the like. Each one of the mobile devices (312, 314, 316) is addressable via a communication address unique to that mobile device.

Embodiments of the invention provide for a mobile software application to be resident on each of the mobile devices (312, 314, 316) which allows users to interface with the certificate store modules (332, 334, 336) coupled thereto. The software application may provide: a user interface to facilitate the entry of a passcode into the mobile device (312, 314, 316) to be compared to an offset stored in the certificate store module (332, 334, 336); a list from which users can select digital certificates; notifications of digital certificate requests, or the like. The user interface may include a menu from which at least some of these communications can be initiated. Embodiments of the invention further provide for such an interface to be provided by a SIM Application Toolkit protocol (commonly referred to as the STK protocol) implementation or the like.

Exemplary communication devices (322, 324, 326) include desktop computers, laptop computers, mobile phones, tablet computers or any other appropriate communication device. Each of the communication devices (322, 324, 326) is at least configured to send and receive data messages and to request a digital certificate from the remotely accessible server (340). Each of the communication devices (322, 324, 326) may be further configured to digitally sign or encrypt a data message.

The term "data message" may include any digital document, such as from the group of: an email or other digital message; a digital image; a computer file; a computer folder or directory; a computer program or the like.

Embodiments of the invention provide for a mobile device (e.g. 312) and a communications device (e.g. 322) to be the same device. For example, a user (e.g. 302) may use a single device, having a certificate store module (332) coupled thereto, to request a digital certificate from the remotely accessible server (340), authorize the release of the digital certificate from the certificate store module (332) and receive the digital certificate.

The remotely accessible server (340) is a server computer which is at least configured to receive a request for a digital certificate from a communication device (e.g. 322) and to query a database to identify a communication address of a certificate store module (332) or mobile device (312) associated with the communication device (322). The remotely accessible server (340) is further configured to request, via the mobile device (312) and using the communication address, a digital certificate from the certificate store module (332) and subsequently receive a digital certificate from the certificate store module (332). The remotely accessible server (340) is then configured to transmit the digital certificate to the communication device (322). The remotely accessible server's (340) communications with the certificate store modules (332, 334, 336) may be via a mobile device (312, 314, 316) corresponding to that certificate store module (332, 334, 336). The request for a digital certificate is sent to the mobile device (e.g. 312) and is intercepted by the certificate store module (332) therein. The remotely accessible server may additionally provide routing functionality such that requests received for digital certificates from a communication device are routed to a corresponding certificate store module. Alternately, such routing functionality may be provided by a separate routing server or routing directory.

Each of the certificate store modules (332, 334, 336) includes an SPU and a PPU, and is configured to securely store one or more digital certificates. The certificate store modules (332, 334, 336) are further configured to receive a request for a digital certificate from the remotely accessible server (340). The certificate store modules (332, 334, 336) are configured to request for, and receive, user authorization via a mobile device (312, 314, 316) to which the certificate store module is coupled. Following successful authorization, the certificate store module (e.g. 332) is configured to communicate the relevant digital certificate to the remotely accessible server (340). Each of the certificate store modules (332, 334, 336) is addressable via a communication address corresponding to a mobile device (312, 314, 316) associated therewith.

FIG. 3 also shows a certificate authority (350) which is in communication with the remotely accessible server (340) and is configured to generate and validate digital certificates.

In some embodiments of the invention, the certificate store modules (332, 334, 336) may be in communication with corresponding communication devices (322, 324, 326) directly via the mobile devices (312, 314, 316) to which they are coupled. Such a configuration allows for the digital certificates to be sent directly from the certificate store modules (332, 334, 336), through the mobile devices (312, 314, 316) to which they are coupled, to the corresponding communication devices (322, 324, 326) without being transmitted by the remotely accessible server.

Figure 4A:
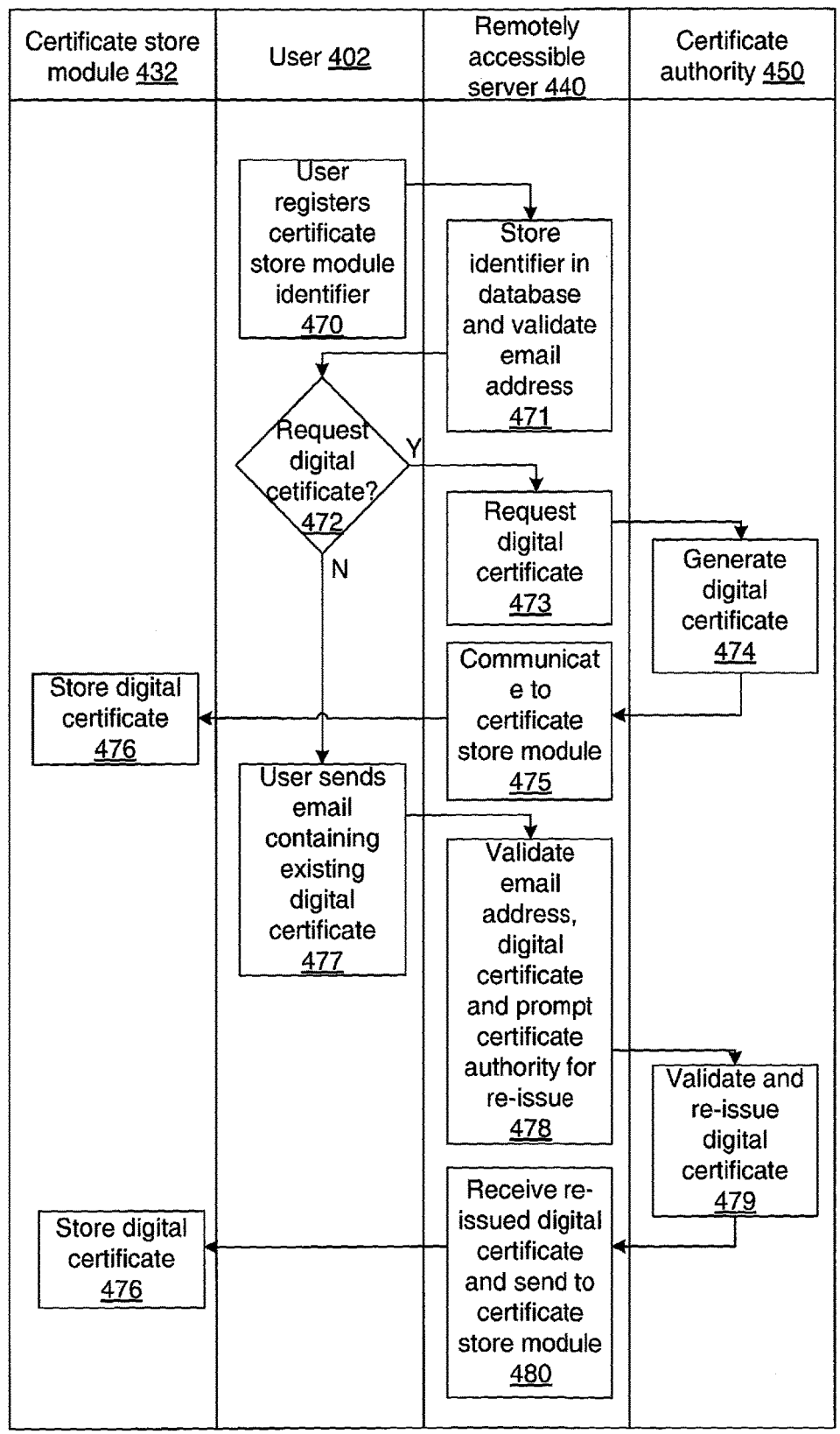
FIG. 4A is a swim-lane flow diagram which illustrates a system in-use in registration stage according to embodiments of the invention.

FIG. 4A illustrates an in-use scenario of the system (300) illustrated in FIG. 3 in which a user (402) registers with the system. The user (402), having obtained a certificate store module (432) and wishing to make use of his or her certificate store module (432) to digitally sign and/or encrypt his or her email or other data message, registers (470) a certificate store identifier of his or her certificate store module (432) as well as a communication address of a mobile device associated with the user's certificate store module (432), with a remotely accessible server (440).

The remotely accessible server (440) then stores (471) this identifier in a user profile database. In addition to this, the user validates an email address with the remotely accessible server (440) for which he or she wishes to send and receive digitally encrypted and/or signed emails which is also stored in the user profile database. The remotely accessible server (440) then allows the user to request a digital certificate from a participating certificate authority (450), or allows the user to make use of a pre-existing digital certificate.

If (472) the user requests a digital certificate, the remotely accessible server (440) will then request (473) a digital certificate from the participating certificate authority (450) in respect of the user's registered email address. The certificate authority (450) will generate (474) a digital certificate and transmit the generated digital certificate to the remotely accessible server (410) which will, upon receiving the digital certificate from the certificate authority (450), communicate (475) the certificate to the user's certificate store module (432) for storage (476).

If (472) the user wishes to make use of a pre-existing certificate, the remotely accessible server (440) prompts the user to send a digitally signed email to a specified email address of the remotely accessible server (440). The user sends (477) a digitally signed email to a specified email address of the remotely accessible server (440) which then validates (478) the digital certificate received in the digitally signed email received from the user with a relevant certificate authority and then prompts the relevant certificate authority for a re-issue of the digital certificate. The digital certificate is re-issued (479) and transmitted back to the remotely accessible server. The remotely accessible server (440) receives (480) the re-issued digital certificate and transmits the re-issued digital certificate to the user's certificate store module (432), upon receiving user authorization to do so, for storage (476) thereat.

Figure 4B:
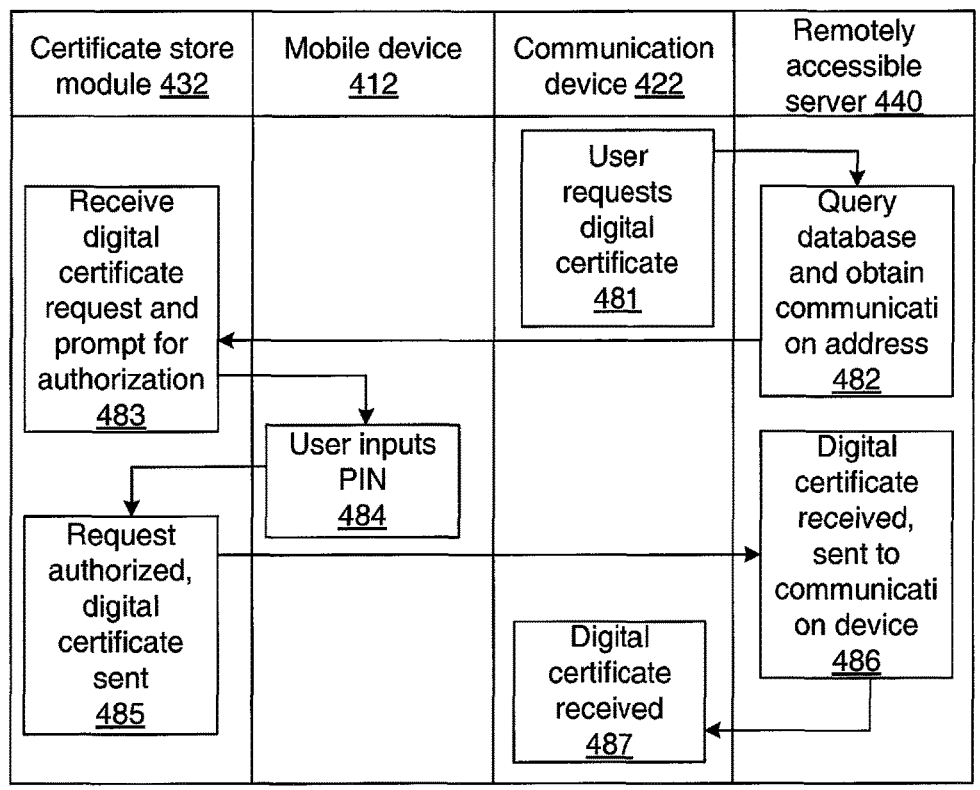
FIG. 4B is a swim-lane flow diagram which illustrates a system in-use according to embodiments of the invention.

FIG. 4B illustrates a scenario of the system (300) illustrated in FIG. 3 in use by a user having already registered him- or herself with the remotely accessible server. A user, wishing to make use of a digital certificate, for example to digitally sign a data message to be sent from his or her communication device (422) or to decrypt a data message received on his or her communication device (422), uses his or her communication device (422) to transmit (481) a digital certificate request to a remotely accessible server (440). The remotely accessible server (440) receives (482) this request and uses information included therein, such as a certificate store identifier, to query a database so as to identify a communication address of a mobile device (412) associated with the request and/or communication device (422) of the user. Having obtained a communication address to which messages may be addressed (e.g. a mobile subscriber integrated services digital network-number, "MSISDN", or the like), the remotely accessible server (440) transmits a digital certificate request to the certificate store module (432) via the mobile device (412). The certificate store module (432) receives the request and then authorizes the request by prompting (483) the user for his or her passcode via the mobile device (412). The user enters (484) his or her passcode into the mobile device (412) and the certificate store module (432) compares the entered passcode to an offset stored therein. If there is a match between the entered passcode and the offset, the certificate store module (432) releases the relevant digital certificate and transmits (485) the digital certificate to the remotely accessible server (440) via the mobile device (412). The digital certificate is received (486) at the remotely accessible server (440) and is communicated to the communication device (422), whereat it is received (487), for use by the user.

In some embodiments of the invention, the functions performed by the mobile device (412) and the functions performed by the communication device (422) may be performed by a single device. For example, the mobile device (412) may request the digital certificate from the remotely accessible server (410) and, in response, receive the requested digital certificate for use thereat. Alternatively, the communication device (422) may have its own certificate store module (432) coupled thereto and in electrical communication therewith and may request the digital certificate from the remotely accessible server (410) and, in response, receive the requested digital certificate for use thereat.

The certificate store module may be configured to not accept requests for digital certificates from devices other than the remotely accessible server. As the remotely accessible server (410) is the only device which is operable request digital certificates from the certificate store module (432), the device to which the certificate store module (432) is coupled is not operable to request digital certificates directly from the certificate store module (432). The device to which the certificate store module (432) is coupled is merely permitted to pass requests for digital certificates received from the remotely accessible server (410) to the certificate store module (432).

Figure 4C:
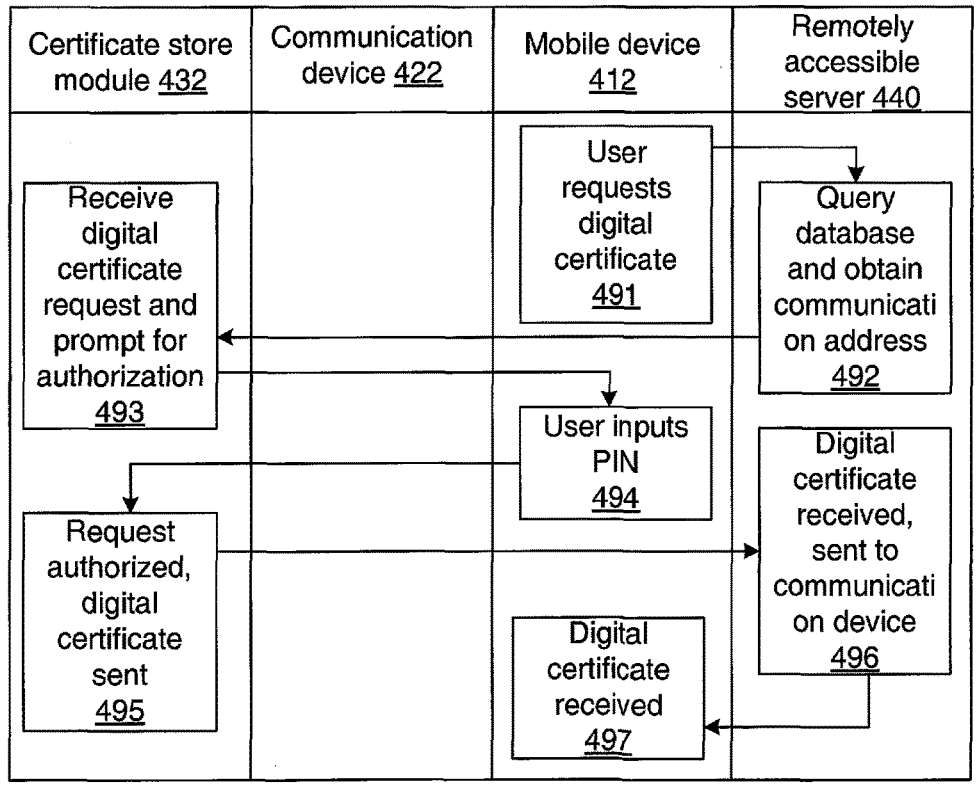
FIG. 4C is a swim-lane flow diagram which illustrates an exemplary embodiment of the invention in which a mobile device is configured to perform operations of a communication device in addition to operations of the mobile device.

FIG. 4C is a swim-lane flow diagram which illustrates an exemplary embodiment of the invention in which the mobile device (412) is configured to perform the operations of the communication device (422) in addition to the operations of the mobile device (412).

A user, wishing to make use of a digital certificate, for example to digitally sign a data message to be sent from his or her mobile device (412) or to decrypt a data message received on his or her mobile device (412), uses his or mobile device (412) to transmit (491) a digital certificate request to a remotely accessible server (440). The remotely accessible server (440) receives (492) this request. The remotely accessible server may use information included therein, such as a certificate store identifier, to query a database so as to identify whether the communication address of the mobile device (412) from which the request is received is valid. The remotely accessible server (440) then transmits a digital certificate request to the certificate store module (432) via the mobile device (412). The certificate store module (432) then authorizes the request by prompting (493) the user for his or her passcode via the mobile device (412). The user enters (494) his or her passcode into the mobile device (412) and the certificate store module (432) compares the entered passcode to an offset stored therein. If there is a match between the entered passcode and the offset, the certificate store module (432) releases the relevant digital certificate and transmits (495) the digital certificate to the remotely accessible server (440) via the mobile device (412). The digital certificate is received (496) at the remotely accessible server (440) and is communicated to the mobile device (412), whereat it is received (497), for use by the user.

Figure 5:
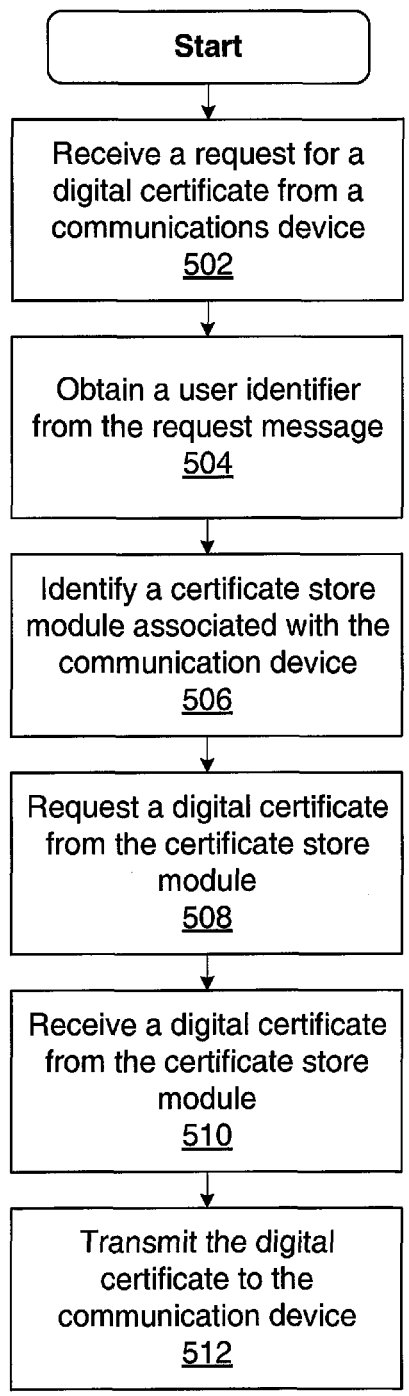
FIG. 5 is a flow diagram which illustrates a method according to embodiments of the invention.

FIG. 5 illustrates a method (500) which is conducted at a remotely accessible server. The method includes a first step (502) of receiving, from a communications device, a request for a digital certificate to sign or encrypt a data message. The request for a digital certificate may be in the form of a hypertext transfer protocol (HTTP) request message and may at least include an identifier of a user or a user's certificate store module.

The method includes a next step (504) of extracting an identifier from the request. The identifier may, for example, be extracted from a path portion of a uniform resource locator (URL) submitted to the remotely accessible server by the communications device as a part of a HTTP request message. Alternatively, the identifier may be provided in the form of an email address corresponding to the user in respect of whom a digital certificate is requested.

The method further includes a following step (506) of querying a database to determine if the identifier has been registered with the remotely accessible server and, if the identifier is registered, obtaining from the database a communication address (e.g. an MSISDN, or the like) of a mobile device associated with the identifier. The identified mobile device having a certificate store module in communication therewith.

Following this, the remotely accessible server may conduct a step (508) of requesting, from the certificate store module of the mobile device, a digital certificate which is followed by a step (510) of receiving a digital certificate from the certificate store module.

A final step (512) includes transmitting the digital certificate to the communication device. This may be conducted by generating and transmitting an HTTP response message which includes the digital certificate. The digital certificate communicated to the communication device may further include information pertaining to permitted use of the certificate (e.g., it may be open for use for 1 hour) or the number of times it may be used (e.g. only a specified number of emails may be signed). The digital certificate may also include a set of rules that could be configured to specify the nature of the authentication required.

Figure 6:
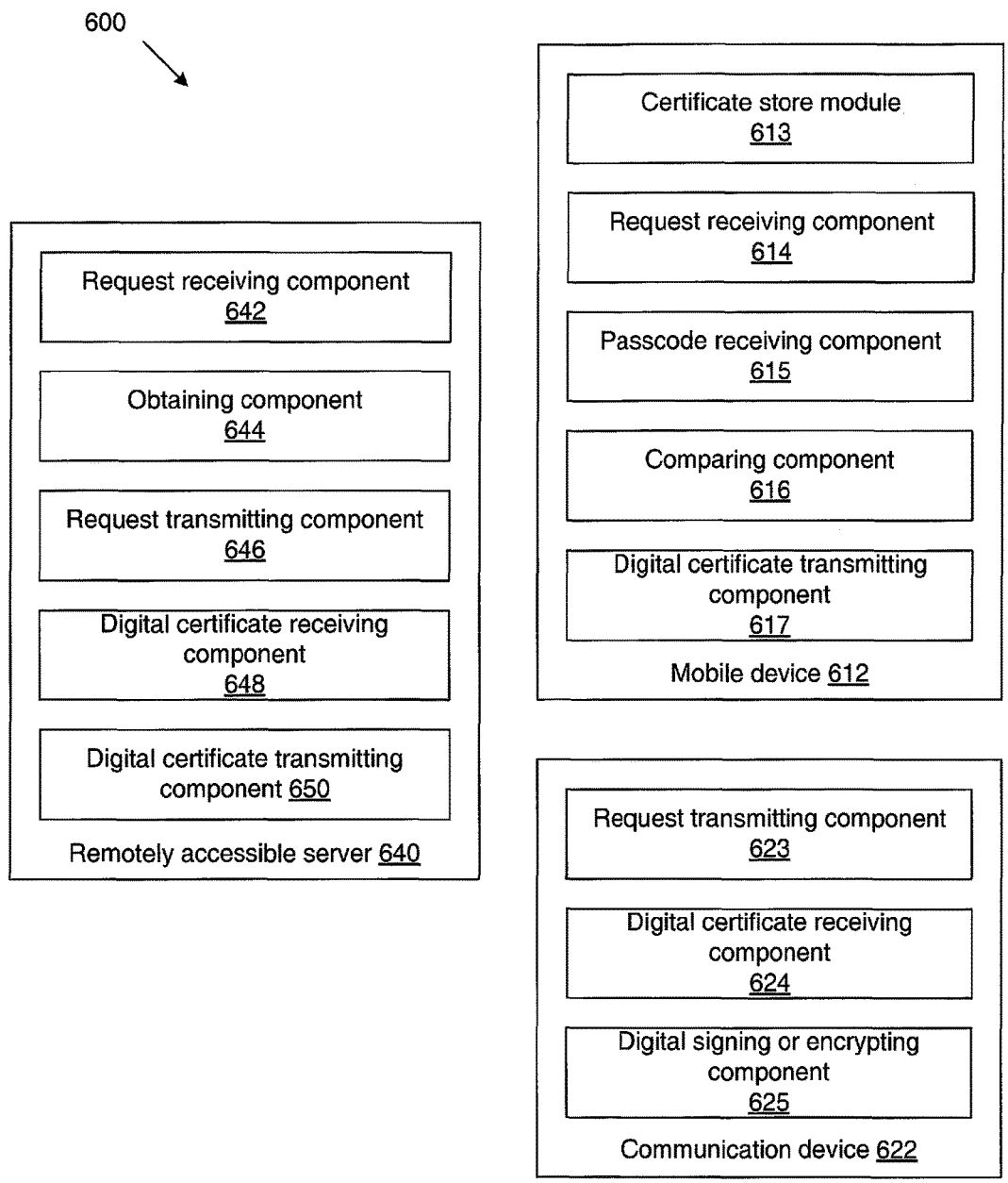
FIG. 6 is a block diagram which illustrates components of devices of a system according to embodiments of the invention.

FIG. 6 is a block diagram which illustrates components of devices of a system (600) according to embodiments of the invention. The system (600) includes a remotely accessible server (640), a mobile device (612) and a communication device (622).

The remotely accessible server (640) may include a request receiving component (642) for receiving a request for a digital certificate. The request includes an identifier. The remotely accessible server (640) may also include an obtaining component (644) for obtaining a communication address of a mobile device associated with the identifier. The mobile device may have a certificate store module in communication therewith. The remotely accessible server may further include a request transmitting component (646) for transmitting a request for a digital certificate to the certificate store module via the mobile device and a digital certificate receiving component (648) for receiving the digital certificate from the certificate store module via the mobile device in response to entry of a passcode into the certificate store module corresponding to an offset stored in the certificate store module. The remotely accessible server may further include a digital certificate transmitting component (650) for transmitting the digital certificate to a communication device for use in digitally signing or encrypting a data message.

The mobile device (612) has a certificate store module (613) coupled thereto and in communication therewith. The certificate store module (613) may have one or more digital certificates stored therein. The mobile device (612) may further include a request receiving component (614) for receiving, from the remotely accessible server (640), the request for a digital certificate. The request may be transmitted by the remotely accessible server (640) in response to the remotely accessible server (640) receiving a digital certificate request. The mobile device (612) may further include a passcode receiving component (615) for receiving a passcode entered by a user in order to authorize release of the digital certificate and a comparing component (616) for comparing the entered passcode to an offset thereof. The mobile device may include a digital certificate transmitting component (617) for, if the entered passcode corresponds to the offset, transmitting the digital certificate from the certificate store module to the remotely accessible server (640) for transmission to a communication device and use in digitally signing or encrypting the data message thereat.

The communication device (622) may include a request transmitting component (623) for transmitting a request for a digital certificate to the remotely accessible server (640) and digital certificate receiving component (624) for receiving the digital certificate from the remotely accessible server (640) and a digital signing or encrypting component (625) for digitally signing or encrypting the data message using the received digital certificate.

The certificate store module (617) may be configured to transmit the digital certificate to the remotely accessible server (640) only in response to receiving a request for a digital certificate from the remotely accessible server (640). In some embodiments of the invention, functions performed by the mobile device (612) and functions performed by the communication device (622) may be performed by a single device. The single device may, for example be a mobile device having components of both the mobile device (612) and the communication device (622).

Figure 7:
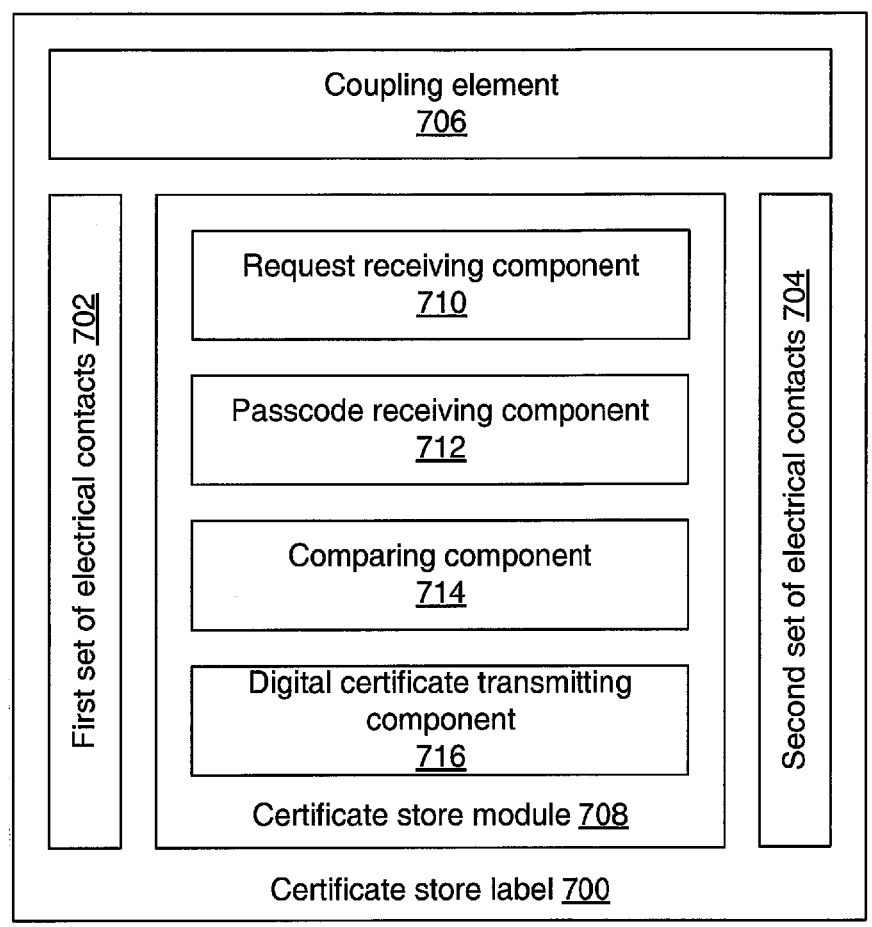
FIG. 7 is a block diagram which illustrates a certificate store label for providing digital certificates according to embodiments of the invention.

FIG. 7 is a block diagram which illustrates a certificate store label (700) for providing digital certificates according to embodiments of the invention. The certificate store label (700) may include a first set of electrical contacts (702) disposed on a top side of the certificate store label for interfacing to a mobile device and a second set of electrical contacts (704) disposed on a bottom side of the certificate store label for interfacing to a communication component. The certificate store label (700) may further include a coupling element (706) configured to attach the certificate store label (700) to the communication component. The certificate store label (700) may further include a certificate store module (708) disposed in the certificate store label and coupled to the first and second sets of electrical contacts.

The certificate store module (708) may have a digital certificate stored therein and may include a request receiving component (710) for receiving, from a remotely accessible server, a request for a digital certificate. The request may have been transmitted by the remotely accessible server in response to the remotely accessible server receiving a digital certificate request. The certificate store module (708) may further include a passcode receiving component (712) for receiving a passcode entered by a user in order to authorize release of the digital certificate and a comparing component (714) for comparing the entered passcode to an offset thereof. The certificate store module (708) may further include a digital certificate transmitting component (716) for, if the entered passcode corresponds to the offset, transmitting the digital certificate from the certificate store module (708) to the remotely accessible server for transmission to a communication device and use in digitally signing or encrypting a data message thereat.

Figure 8:
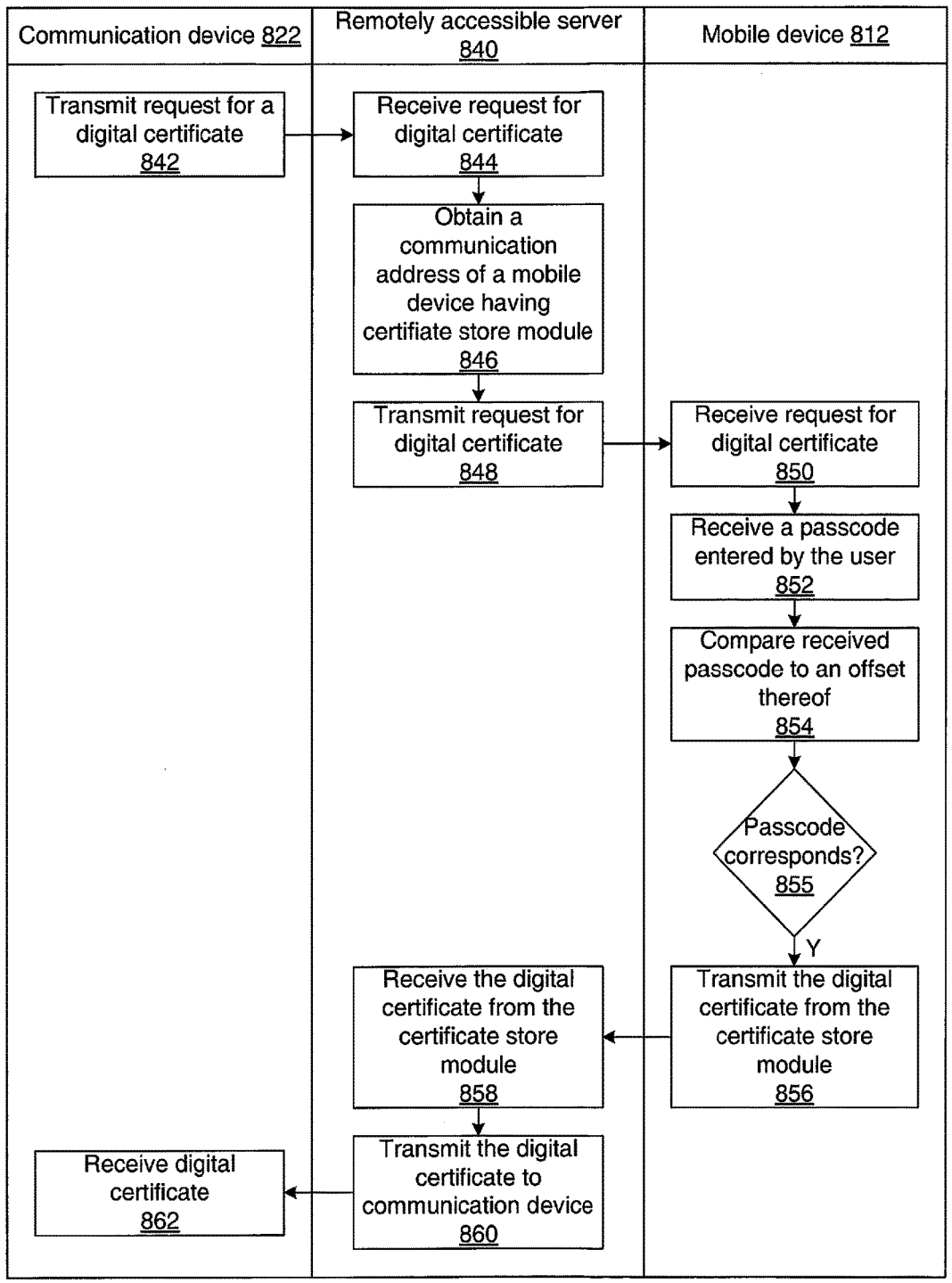
FIG. 8 is a swim-lane flow diagram which illustrates methods conducted at a remotely accessible server, a mobile device and a communication device according to embodiments of the invention.

FIG. 8 is a swim-lane flow diagram which illustrates methods conducted at a remotely accessible server (840), a mobile device (812) and a communication device (822) according to embodiments of the invention. FIG. 8 is similar to FIG. 4B, illustrating methods according to another embodiment of the invention.

At a first step (842), a request for a digital certificate is transmitted from the communication device (822) to the remotely accessible server (840).

The request for a digital certificate, which may include an identifier, is received at the remotely accessible server (840) in a next step (844) and the remotely accessible server (840) then obtains a communication address of a mobile device associated with the identifier in a following step (846). This may include extracting the identifier from the request, querying a database to determine if the identifier has been registered with the remotely accessible server and, if the identifier is registered, obtaining, from the database, a communication address of a mobile device associated with the identifier. The identified mobile device may have a certificate store module coupled thereto and in communication therewith.

In a next step (848), the remotely accessible server (840) may transmit a request for a digital certificate to the certificate store module via the mobile device.

The mobile device (812), in a following step (850), receives the request for a digital certificate from the remotely accessible server (840).

The mobile device (812) may then prompt a user for a passcode in order to authorize release of the digital certificate from the certificate store module and, in a following step (852), receives a passcode entered by the user.

In a next step (854), the mobile device compares the received passcode to an offset thereof and if (855) the entered passcode corresponds to the offset, transmits the digital certificate from the certificate store module to the remotely accessible server (840) for transmission to a communication device and use in digitally signing or encrypting a data message thereat in a following step (856). In some embodiments of the invention, some of the steps of prompting a user for a passcode, receiving an entered passcode (852), comparing the entered passcode to an offset thereof (854) and transmitting the passcode to the remotely accessible server (856) may be conducted by the certificate store module.

In a next step (858), the remotely accessible server receives the digital certificate from the certificate store module via the mobile device and, in a following step (860) transmits the digital certificate to the communication device (822) for use in digitally signing or encrypting a data message.

The communication device (822) then receives the digital certificate in a final step (862) and may then use the digital certificate to digitally sign or encrypt a data message.

The systems, methods, devices and certificate store modules described above with reference to the accompanying figures accordingly allows a user to securely store digital certificates which may be used for signing, encrypting, and decrypting data or data messages. The certificates may be accessed over an 'out-of-band' channel by a communication device from which a user wishes to sign, encrypt or decrypt data via a remotely accessible server. This reduces the risk of successful man-in-the-middle or key-stroke logging attempts which seek to provide miscreants with digital certificates for fraudulent use.

Figure 9:
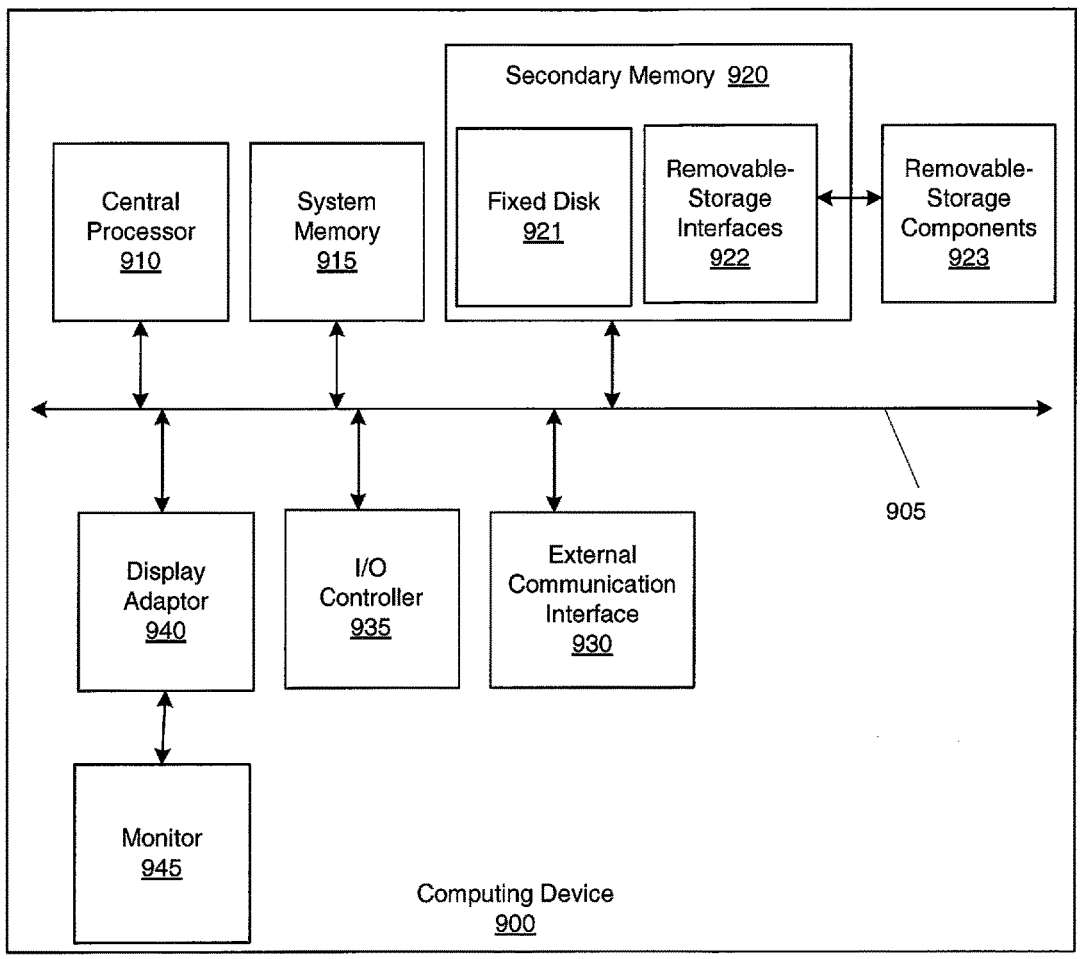
FIG. 9 illustrates an example of a computing device in which various aspects of the disclosure may be implemented; and, FIG. 10 shows a block diagram of a communication device that may be used in embodiments of the disclosure.

FIG. 9 illustrates an example of a computing device (900) in which various aspects of the disclosure may be implemented. The computing device (900) may be suitable for storing and executing computer program code. The various participants and elements in the previously described system diagrams may use any suitable number of subsystems or components of the computing device (900) to facilitate the functions described herein.

The computing device (900) may include subsystems or components interconnected via a communication infrastructure (905) (for example, a communications bus, a cross-over bar device, or a network). The computing device (900) may include at least one central processor (910) and at least one memory component in the form of computer-readable media.

The memory components may include system memory (915), which may include read only memory (ROM) and random access memory (RAM). A basic input/output system (BIOS) may be stored in ROM. System software may be stored in the system memory (915) including operating system software.

The memory components may also include secondary memory (920). The secondary memory (920) may include a fixed disk (921), such as a hard disk drive, and, optionally, one or more removable-storage interfaces (922) for removable-storage components (923).

The removable-storage interfaces (922) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (922) may also be in the form of ports or sockets for interfacing with other forms of removable-storage components (923) such as a flash memory drive, external hard drive, or removable memory chip, etc.

The computing device (900) may include an external communications interface (930) for operation of the computing device (900) in a networked environment enabling transfer of data between multiple computing devices (900). Data transferred via the external communications interface (930) may be in the form of signals, which may be electronic, electromagnetic, optical, radio, or other types of signal.

The external communications interface (930) may enable communication of data between the computing device (900) and other computing devices including servers and external storage facilities. Web services may be accessible by the computing device (900) via the communications interface (930).

The external communications interface (930) may also enable other forms of communication to and from the computing device (900) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (910).

A computer program product may be provided by a non-transient computer-readable medium, or may be provided via a signal or other transient means via the communications interface (930).

Interconnection via the communication infrastructure (905) allows a central processor (910) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (900) either directly or via an I/O controller (935). These components may be connected to the computing device (900) by any number of means known in the art, such as a serial port.

One or more monitors (945) may be coupled via a display or video adapter (940) to the computing device (900).

Figure 10:
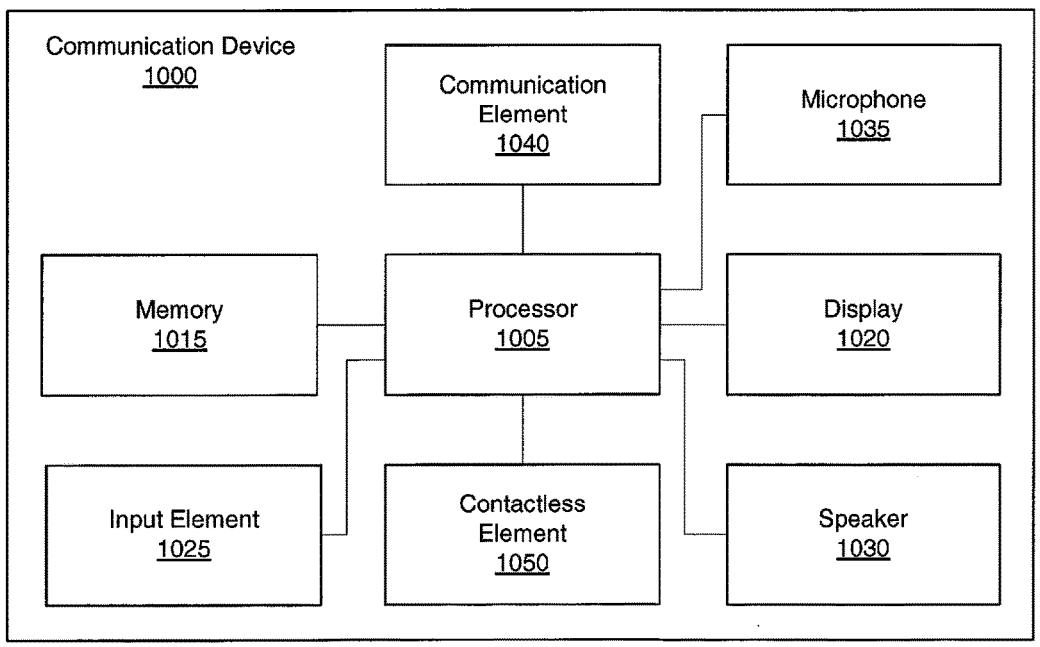

FIG. 10 shows a block diagram of a communication device (1000) that may be used in embodiments of the disclosure. The communication device (1000) may be a cell phone, a feature phone, a smart phone, a satellite phone, or a computing device having a phone capability.

The communication device (1000) may include a processor (1005) (e.g., a microprocessor) for processing the functions of the communication device (1000) and a display (1020) to allow a user to see the phone numbers and other information and messages. The communication device (1000) may further include an input element (1025) to allow a user to input information into the device (e.g., input buttons, touch screen, etc.), a speaker (1030) to allow the user to hear voice communication, music, etc., and a microphone (1035) to allow the user to transmit his or her voice through the communication device (1000).

The processor (1010) of the communication device (1000) may connect to a memory (1015). The memory (1015) may be in the form of a computer-readable medium that stores data and, optionally, computer-executable instructions.

The communication device (1000) may also include a communication element (1040) for connection to communication channels (e.g., a cellular telephone network, data transmission network, Wi-Fi network, satellite-phone network, Internet network, Satellite Internet Network, etc.). The communication element (1040) may include an associated wireless transfer element, such as an antenna.

The communication element (1040) may include a subscriber identity module (SIM) in the form of an integrated circuit that stores an international mobile subscriber identity and the related key used to identify and authenticate a subscriber using the communication device (1000). One or more subscriber identity modules may be removable from the communication device (1000) or embedded in the communication device (1000).

The communication device (1000) may further include a contactless element (1050), which is typically implemented in the form of a semiconductor chip (or other data storage element) with an associated wireless transfer element, such as an antenna. The contactless element (1050) may be associated with (e.g., embedded within) the communication device (1000) and data or control instructions transmitted via a cellular network may be applied to the contactless element (1050) by means of a contactless element interface (not shown). The contactless element interface may function to permit the exchange of data and/or control instructions between mobile device circuitry (and hence the cellular network) and the contactless element (1050).

The contactless element (1050) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (1000) and an interrogation device. Thus, the communication device (1000) may be capable of communicating and transferring data and/or control instructions via both a cellular network and near field communications capability.

The data stored in the memory (1015) may include: operation data relating to the operation of the communication device (1000), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (1000) to selected receivers.

The communication device (1000) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing digital certificates, conducted at a remotely accessible server and comprising the steps of:
   receiving, by a remotely accessible server and from a communication device, a request for a digital certificate, the request including an identifier associated with a certificate store module of a mobile device, the certificate store module including a database configured to store a plurality of digital certificates;
   obtaining, by the remotely accessible server, a communication address of the mobile device associated with the identifier, wherein the certificate store module is in or coupled to the mobile device;
   transmitting, by the remotely accessible server, a request for a digital certificate to the certificate store module via the mobile device, wherein the certificate store module is configured to prompt a user thereof, via the mobile device, for a passcode before releasing the certificate;
   receiving, by the remotely accessible server, the digital certificate from the certificate store module via the mobile device in response to entry of a passcode into the certificate store module which corresponds to an offset stored in the certificate store module; and,
   transmitting, by the remotely accessible sever, the digital certificate to the communication device for use in digitally signing or encrypting a data message,
   wherein the step of obtaining the communication address of the mobile device associated with the identifier includes:
   extracting, by the remotely accessible server, the identifier from the request,
   wherein the step of extracting the identifier from the request includes extracting the identifier from a path portion of a uniform resource locator (URL) submitted to the remotely accessible server by the communication device, and wherein the identifier is an alphanumeric sequence uniquely associated with the certificate store module.

2. The method as claimed in claim 1, wherein the step of obtaining the communication address of the mobile device associated with the identifier further includes steps of:
   querying, by the remotely accessible server, a database to determine if the identifier has been registered with the remotely accessible server; and,
   if the identifier is registered, obtaining, by the remotely accessible server and from the database, a communication address of the mobile device associated with the identifier.

3. The method as claimed in claim 1, wherein the step of receiving the request for the digital certificate includes receiving a hypertext transfer protocol request message.

4. The method as claimed in claim 1, wherein the step of extracting the identifier from the request includes extracting an email address included in the request.

5. The method as claimed in claim 1, wherein the steps of transmitting the request for the digital certificate to the certificate store module, receiving the digital certificate from the certificate store module, and transmitting the digital certificate to the communication device are conducted over an encrypted tunnel; and wherein the encrypted tunnel is an internet protocol security (IPSec), secure socket layer (SSL), transport layer security (TLS) or secure shell (SSH) encrypted tunnel.

6. A method for providing digital certificates conducted at a mobile device which has a certificate store module coupled thereto in which a digital certificate is stored, the method comprising the steps of:
receiving, by a certificate store module associated with a mobile device and from a remotely accessible server, a request for a digital certificate, the request having been transmitted by the remotely accessible server in response to the remotely accessible server receiving a digital certificate request from a communication device, wherein the certificate store module is in or coupled to the mobile device and wherein the certificate store module includes a database configured to store a plurality of digital certificates, wherein an identifier for the mobile device was extracted from a path portion of a uniform resource locator (URL) submitted to the remotely accessible server, wherein the identifier is an alphanumeric sequence uniquely associated with the certificate store module;
receiving, by the certificate store module, a passcode entered by a user via the mobile device in order to authorize release of the digital certificate;
comparing, by the certificate store module, the entered passcode to an offset thereof; and,
if the entered passcode corresponds to the offset, transmitting, by the certificate store module, the digital certificate from the certificate store module to the remotely accessible server for transmission to the communication device and use in digitally signing or encrypting a data message thereat.

7. The method as claimed in claim 6, wherein the certificate store module is configured to transmit the digital certificate to the remotely accessible server only in response to receiving the request for the digital certificate from the remotely accessible server.

8. A system for providing digital certificates comprising a remotely accessible server, the remotely accessible server comprising:
a first processor; and
a first computer readable medium communicatively coupled to the first processor, wherein first the processor is configured to perform operations comprising:
receiving, from a communication device, a request for a digital certificate, the request including an identifier associated with a certificate store module of a mobile device, wherein the certificate store module includes a database configured to store a plurality of digital certificates;
obtaining a communication address of the mobile device associated with the identifier, wherein the certificate store module is in or coupled to the mobile device;
transmitting a request for a digital certificate to the certificate store module via the mobile device, wherein the certificate store module is configured to prompt a user thereof, via the mobile device, for a passcode before releasing the certificate;
receiving the digital certificate from the certificate store module via the mobile device in response to entry of a passcode into the certificate store module corresponding to an offset stored in the certificate store module; and,
transmitting the digital certificate to the communication device for use in digitally signing or encrypting a data message,
wherein the step of obtaining the communication address of the mobile device associated with the identifier includes a step of:
extracting, by the remotely accessible server, the identifier from the request,
wherein the step of extracting the identifier from the request includes extracting the identifier from a path portion of a uniform resource locator (URL) submitted to the remotely accessible server by the communication device, and wherein the identifier is an alphanumeric sequence uniquely associated with the certificate store module.

9. The system as claimed in claim 8, wherein the system further includes the mobile device which has a certificate store module coupled thereto in which a digital certificate is stored, wherein the mobile device comprises:
a second processor; and
a second computer readable medium communicatively coupled to the second processor, wherein the second processor is configured to perform operations comprising:
receiving, from the remotely accessible server, the request for the digital certificate, the request having been transmitted by the remotely accessible server in response to the remotely accessible server receiving the digital certificate request from the communication device;
receiving a passcode entered by a user in order to authorize release of the digital certificate;
comparing the entered passcode to an offset thereof; and,
if the entered passcode corresponds to the offset, transmitting the digital certificate from the certificate store module to the remotely accessible server for transmission to the communication device and use in digitally signing or encrypting the data message thereat.

10. The system as claimed in claim 8, wherein the system further includes the communication device, wherein the communication device is configured: to transmit the request for the digital certificate to the remotely accessible server; to receive the digital certificate from the remotely accessible server; and, to digitally sign or encrypt the data message using the received digital certificate.

11. The system as claimed in claim 8, wherein the digital certificate is a secure/multipurpose internet mail extensions (S/MIME) standard digital certificate for public key encryption.

12. The system as claimed in claim 9, wherein the certificate store module is disposed in the mobile device.

13. The system as claimed in claim 9, wherein the certificate store module is disposed in a certificate store label; and wherein the certificate store label is coupled to a communication component of the mobile device.

14. The system as claimed in claim 9, wherein the certificate store module is disposed in a communication component of the mobile device; and wherein the communication component is a subscriber identity module (SIM) card.

15. The system as claimed in claim 9, wherein the certificate store module is configured to transmit the digital certificate to the remotely accessible server only in response to receiving a request for a digital certificate from the remotely accessible server, wherein functions performed by the mobile device and functions performed by the communication device are performed by a single device, and wherein the single device is the mobile device.

16. The system as claimed in claim 9, wherein the certificate store module includes a secure processing unit and a public processing unit; wherein the secure processing unit and public processing unit are logically and physically isolated from each other; and wherein the digital certificate is securely stored in the secure processing unit.

17. The system of claim 8, wherein the step of obtaining the communication address of the mobile device associated with the identifier further includes the steps of:
   querying, by the remotely accessible server, a database to determine if the identifier has been registered with the remotely accessible server; and,
   if the identifier is registered, obtaining, by the remotely accessible server and from the database, a communication address of the mobile device associated with the identifier.

\* \* \* \* \*